United States Patent
Reguraman et al.

(10) Patent No.: US 8,301,786 B2
(45) Date of Patent: Oct. 30, 2012

(54) APPLICATION SESSION CONTROL USING PACKET INSPECTION

(75) Inventors: Praveenkumar Reguraman, Santa Clara, CA (US); Rajasekhar Manam, Bangalore (IN); Sridar Kandaswamy, San Jose, CA (US); Abhijit V. Warkhedi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 12/703,420

(22) Filed: Feb. 10, 2010

(65) Prior Publication Data
US 2011/0196971 A1   Aug. 11, 2011

(51) Int. Cl.
*G06F 15/16*   (2006.01)
(52) U.S. Cl. ........ 709/228; 709/223; 709/224; 709/233; 709/238
(58) Field of Classification Search .......... 709/224, 709/228, 233, 236, 223, 238; 726/13, 23; 370/229, 400, 242
See application file for complete search history.

(56) References Cited

U.S. PATENT DOCUMENTS

| | | | |
|---|---|---|---|
| 7,719,966 B2 * | 5/2010 | Luft et al. | 370/229 |
| 7,940,676 B2 * | 5/2011 | Griffin et al. | 709/223 |
| 7,970,930 B2 * | 6/2011 | Dobbins et al. | 709/238 |
| 2007/0297333 A1 * | 12/2007 | Zuk et al. | 370/389 |
| 2008/0077705 A1 * | 3/2008 | Li et al. | 709/236 |
| 2008/0201772 A1 * | 8/2008 | Mondaeev et al. | 726/13 |
| 2009/0285225 A1 * | 11/2009 | Dahod | 370/401 |
| 2010/0306816 A1 * | 12/2010 | McGrew et al. | 726/11 |
| 2011/0099631 A1 * | 4/2011 | Willebeek-Lemair et al. | 726/23 |

* cited by examiner

*Primary Examiner* — Ramy M Osman
(74) *Attorney, Agent, or Firm* — Patterson & Sheridan, LLP

(57) ABSTRACT

Network devices, computer-readable media, and other embodiments associated with packet inspection are described. Packet inspection may be performed on data packets associated with a session, where a session can include multiple data channels and associated control channels that have been bound together. A session may be associated with an identity. Various policies may be associated with that identity. As packet inspection occurs, it can be determined whether policies are being violated on a per identity basis. If a policy is being violated, then an action may be selectively performed. The action performed may affect a single channel in the session or may affect the whole session. Different identities may have different policies. Example actions include dropping a session, throttling a session, monitoring a session, controlling the number of channels associated with a session, dropping a channel, throttling a channel, monitoring a channel, and other actions.

20 Claims, 6 Drawing Sheets

APPLICATION SESSION CONTROL USING PACKET INSPECTION

BACKGROUND

Applications communicating over networks sometimes open multiple data streams that are a part of the same application session. A single instance of an application may also open multiple data streams. This makes it difficult for a network device to determine how many simultaneous network enabled applications or application instances are operating on a given host. For example, a file transfer protocol (FTP) download may be associated with a control path in addition to an actual download. Additionally, peer to peer applications may open several connections to different types of entities (e.g., control server, peers) while only a single file is actually downloaded. The inability to accurately determine how many legitimate applications, processes, threads or other executables are operating makes it difficult to prevent a single device from opening too many connections of a given type that exceed a permitted limit. A device opening an excessive number of connections may raise security concerns and/or interfere with precise management of quality of service adjustments based on some measures of consumed resources.

BRIEF DESCRIPTION OF THE DRAWINGS

The accompanying drawings, which are incorporated in and constitute a part of the specification, illustrate various example systems, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DESCRIPTION OF EXAMPLE EMBODIMENTS

Overview

Computer readable media and network devices associated with packet inspection are described. The packet inspection may be performed at different levels including at a session level. Similarly, actions may be taken at the session level. A session can include combinations of data channels and associated control channels. A session may be associated with an identity. An identity may be associated with, for example, a user, a piece of hardware, a piece of software, an application, a virtual machine or other entity. A session may be created when related flows are bound together. The session may then be bound to an endpoint identity. Various policies may be associated with that identity. As packet inspection occurs, it can be determined whether policies are being violated. If a policy is being violated, or if criteria associated with an identity match a policy, then an action may be selectively performed. The action performed may affect a single channel in the session or may affect the whole session. Different identities may have different policies. For example, a first identity may be allowed to consume a first amount of resources while a second identity may be allowed to consume a second, greater amount of resources. Example actions include dropping a session, throttling a session, monitoring a session, dropping a channel, throttling a channel, monitoring a channel, and other actions.

By way of illustration, a person using a file sharing application may be downloading several files at once. The file sharing application may open connections with multiple peers that have portions of a file being downloaded. When a new download is initiated, the new download may be associated with a first session value. Connections opened in association with the new download may contain the first session value signifying that the connections are associated with the new download. An internet service provider may decide that while a small number of file sharing sessions are allowable, having too many open at once for a single device may impact the service of other customers. Thus, the internet service provider may configure network routers to drop file sharing sessions after a certain limit has been reached by examining how many different session values are associated with active downloads. In another example, the internet service provider may adjust quality of service settings for file sharing application sessions as the number of active sessions increases.

Figure 3:
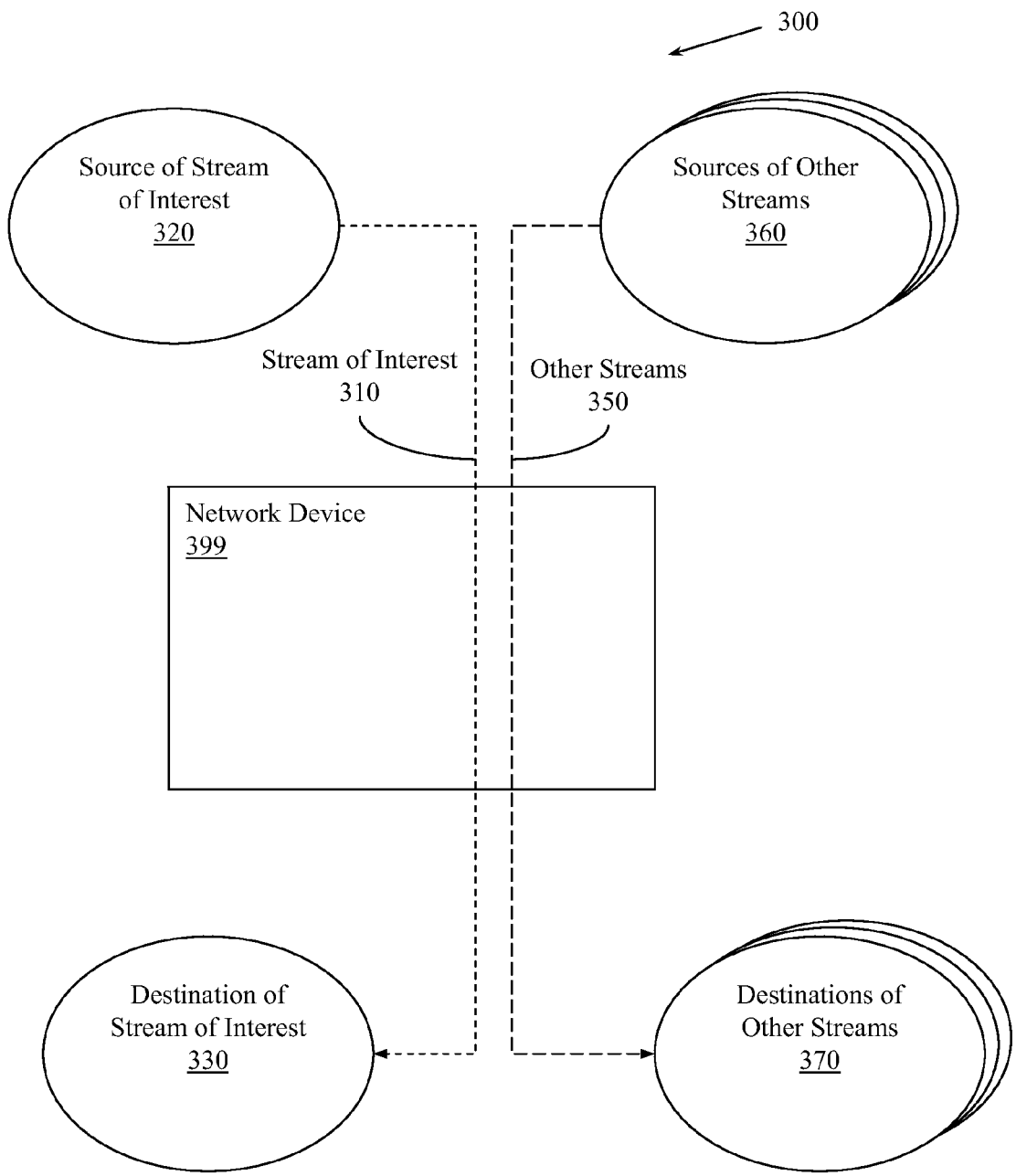
FIG. 3 illustrates an example network in which example systems and methods and equivalents may operate.

The term "data stream", as used herein refers to a sequence of packets transmitted from a source device to a destination device. A data stream is also associated with an application. By way of illustration, FIG. 3 illustrates an example network 300 in which example systems and methods, and equivalents, may operate. The network 300 may include a network device 399. Network device 399 may process multiple data streams simultaneously including a stream of interest 310. The stream of interest 310 may be provided by a source 320 of the stream of interest to a destination 330 of the stream of interest. The network device 399 may also be processing other streams 350 that are being provided by sources 360 of the other streams to destinations 370 of the other streams. In one example, there may be additional data streams initiating and/or terminating at the source 320 of the stream of interest and/or the destination 330 of the stream of interest that are passing through network device 399. While one stream of interest 310 is described, a person having ordinary skill in the art will appreciate that there may be multiple streams of interest starting at source 320 and arriving at destination 330. In one embodiment, these streams may be bound together into a session. A person having ordinary skill in the art will also appreciate how some of these multiple streams may share an application but still be different streams (e.g., two different file transfers, separate audio and video data streams, a control stream and a download stream associated with the same file transfer).

In one example, a data stream may be described by a 5-tuple flow definition. The 5-tuple flow definition may uniquely identify a data stream. However, as described above, two streams from the same source going to the same destination associated with the same application may share the same 5-tuple flow definition. In this case, an additional differentiator (e.g., packet numbering, session data) may be used to differentiate the data streams. The differentiation may be based, for example, on deep packet inspection (DPI) if there is application level discrimination of sessions.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic. The physical manipulations create a concrete, tangible, useful, real-world result.

"Signal," as used herein, includes but is not limited to, electrical signals, optical signals, analog signals, digital signals, data, computer instructions, processor instructions, messages, a bit, and a bit stream that can be received, transmitted and/or detected.

It has proven convenient at times, principally for reasons of common usage, to refer to these signals as bits, values, elements, symbols, characters, terms or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor or similar electronic device that manipulates and transforms data represented as physical (electronic) quantities.

In the following description, numerous specific details are set forth to provide a more thorough understanding of the present disclosure. However, it will be apparent to one of skill in the art that the present disclosure may be practiced without one or more of these specific details. In other instances, well-known features have not been described in order to avoid obscuring the present disclosure.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In one example, a method may be implemented as computer executable instructions. Thus, in one example, a computer-readable medium may store computer executable instructions that if executed by a machine (e.g., processor) cause the machine to perform a method. While executable instructions associated with the above method are described as being stored on a computer-readable medium, it is to be appreciated that executable instructions associated with other example methods described herein may also be stored on a computer-readable medium.

Embodiments of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

Figure 1:
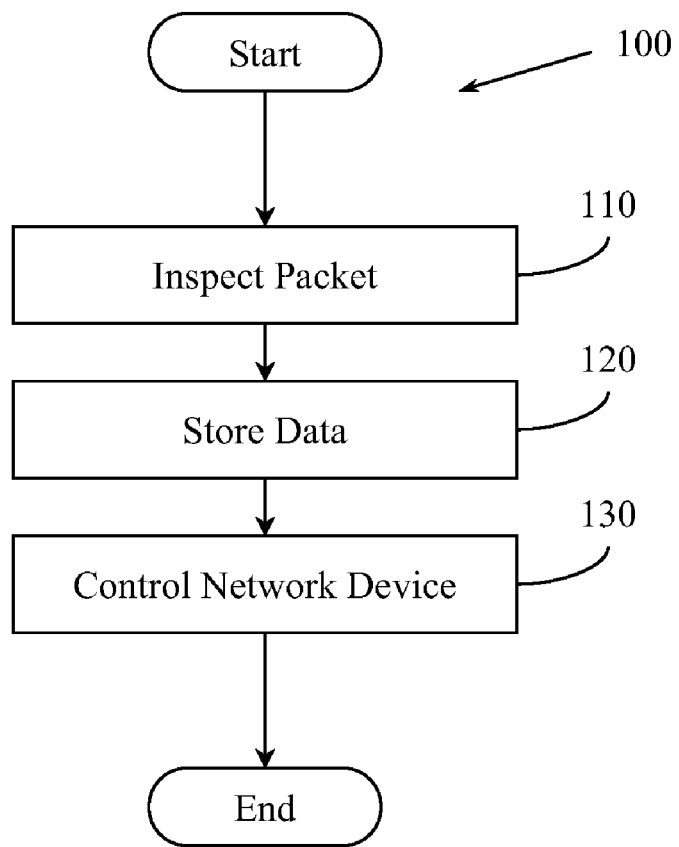
FIG. 1 illustrates an example method associated with packet inspection.

FIG. 1 illustrates a method 100 associated with packet inspection. Method 100 includes, at 110, inspecting a packet associated with a data stream. This inspection may be performed by a network device (e.g., router, switch). The data stream may comprise a sequence of packets transmitted from a source to a destination. The data stream may be associated with a session. A session may include multiple data channels and associated control channels. The session may be associated with an application. The application may be, for example, a hyper text transfer protocol (HTTP) application, a file transfer protocol (FTP) application, a file sharing application, a voice over internet protocol application, a streaming media application, an online gaming application or other application. Inspecting the packet may include determining the application with which the data stream is associated. The application may be classified using stateful classification, stateless classification, statistical classification and other techniques. In one stateful classification example, deep packet inspection may be used to facilitate determining the application with which the data stream is associated. Deep packet inspection may comprise examining packet payload contents. Inspecting the packet may also include determining the session with which the data stream is associated. As described above there are several different techniques that may be used to acquire information from a packet (e.g., stateful, stateless, statistical, deep packet inspection).

Method 100 also includes, at 120, storing a set of data associated with the data stream. The set of data may be acquired as a function of inspecting the packet. The set of data may include data identifying the session, data identifying the application, and data identifying a tracked device. The tracked device may be the source device transmitting the data stream, or the destination device receiving the data stream. In one example, the tracked device may be an identity.

Method 100 also includes, at 130, controlling the network device to selectively perform an action. The action may be, for example, dropping a packet associated with a data stream associated with the tracked device. The action may also be, for example, logging data (e.g., billing data, resource data) associated with the data stream, adjusting a quality of service setting associated with the tracked device and/or a data stream associated with the tracked device, or other action. While a "tracked device" is described, more generally the action may be associated with an identity. The identity may be associated with, for example, a user, a piece of hardware, a piece of software, an application, a virtual machine, or other entity. The action may be performed upon determining that an attribute associated with the identity matches a condition associated with a policy. The action may be associated with both the identity and a session.

In one example, the action may be performed upon determining that the data stream causes an attribute associated with the tracked device to exceed a threshold value for sessions associated with the application or identity. The threshold value may be a number of concurrent sessions, a data rate limit, a data size limit, a number of sessions per unit time, and other values. In one example, data streams associated with a shared session may be counted as being associated with a single session upon determining that the data stream causes the tracked device to exceed a threshold value for sessions associated with the application. For example, a file transfer protocol download stream and a control stream with which the download stream is associated may be considered to be associated with a shared session. In another example, multiple connections associated with a single file sharing application download may be considered to be associated with a session. While two examples are provided, a person having ordinary skill in the art will appreciate that there may be other situations where it is appropriate to consider multiple data streams to be associated with a session. While a threshold is described, more generally, the action may be taken when criteria associated with a policy indicate that an action is to be taken.

By way of illustration, a person may be attempting to access several streaming media applications simultaneously (e.g., multiple flash videos). An internet service provider may configure network devices to track the number of streaming media applications that are being accessed by a single device. In one example, the internet service provider may configure network devices to block additional streaming media connections after a certain number have been reached. This may allow old connections to complete before the amount of bandwidth exceeds values that may cause the connections to slow down due to limited resources. In another example, the internet service provider may allow additional connections to open, but at a temporarily reduced quality of service while older streams are operating. This may allow the new streams to perform initial setup (e.g., buffering) at a low bandwidth rate while the user is focusing on older streams.

"User," as used herein, includes but is not limited to one or more persons, software, logics, computers or other devices, or combinations of these.

While FIG. 1 illustrates various actions occurring in serial, it is to be appreciated that various actions illustrated in FIG. 1 could occur substantially in parallel. By way of illustration, a first process could inspect packets, a second process could store sets of data associated with a data stream, and a third process could control a network device. While three processes are described, it is to be appreciated that a greater and/or lesser number of processes could be employed and that lightweight processes, regular processes, threads and other approaches could be employed.

Recall that packet inspection may be performed on data packets associated with a session, where a session includes multiple data channels and associated control channels that have been bound together. Actions may be taken at the session level. A session may be associated with an identity. Various policies may be associated with that identity. As packet inspection occurs, it can be determined whether policies are being violated on a per identity basis. If a policy is being violated, then an action may be selectively performed. The action performed may affect a single channel in the session or may affect the whole session. Different identities may have different policies. For example, a first identity may be allowed to consume a first amount of resources while a second identity may be allowed to consume a second, greater amount of resources. Example actions include dropping a session, throttling a session, monitoring a session, controlling the number of channels in a session, dropping a channel, throttling a channel, monitoring a channel, and other actions.

Figure 2:
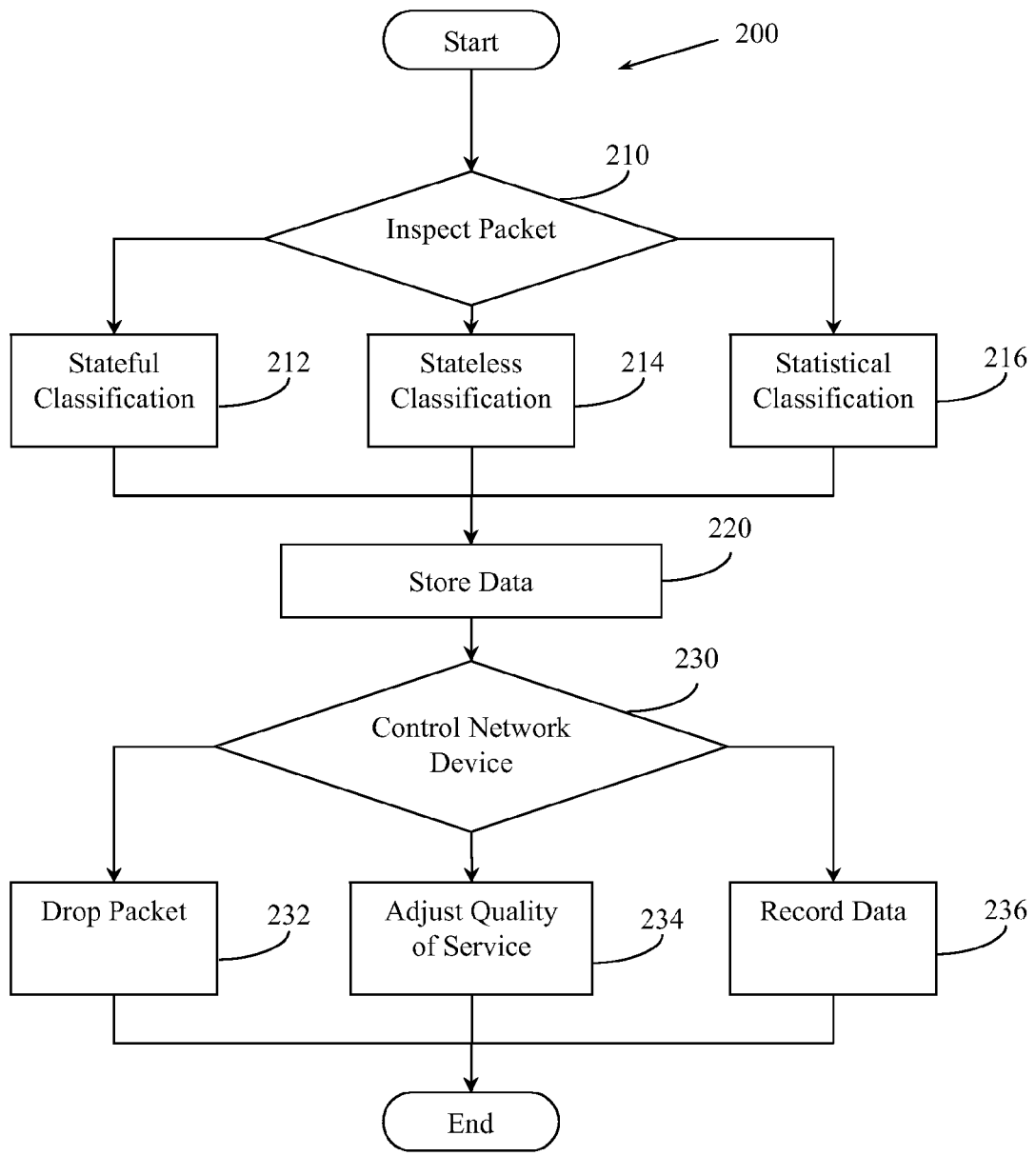
FIG. 2 illustrates an example method associated with packet inspection.

FIG. 2 illustrates a method 200 associated with packet inspection. Method 200 includes several actions similar to those described in connection with method 100 (FIG. 1). For example, method 200 includes inspecting a packet at 210, storing data at 220 and controlling the network device at 230. FIG. 2 also illustrates how a decision may be made when inspecting a packet at 210 to decide which classification technique may be appropriate. For example, an encrypted packet may be difficult to classify with stateful approaches 212 (e.g., deep packet inspection), but statistical classification techniques 216 may produce an accurate result over time. Further, if data in the packet explicitly states data describing the application type, a stateless classification technique 214 may be appropriate. Method 200 also includes a decision when controlling the network device at 230. Based on the number and/or type of open connections, different actions may be appropriate. For example, billing data indicating an increased rate may begin to be recorded 236 at a first threshold, a quality assurance adjustment 234 may be performed at a second threshold, and data streams or packets may be dropped 232 at a third threshold. While three classification techniques and three actions are described, a person having ordinary skill in the art will appreciate that there may be other classification techniques and actions that may be appropriate.

The actions may be based on decisions made on a per identity basis. The actions may then operate on a session as a whole or on a portion of a session (e.g., data channel, control channel).

Figure 4:
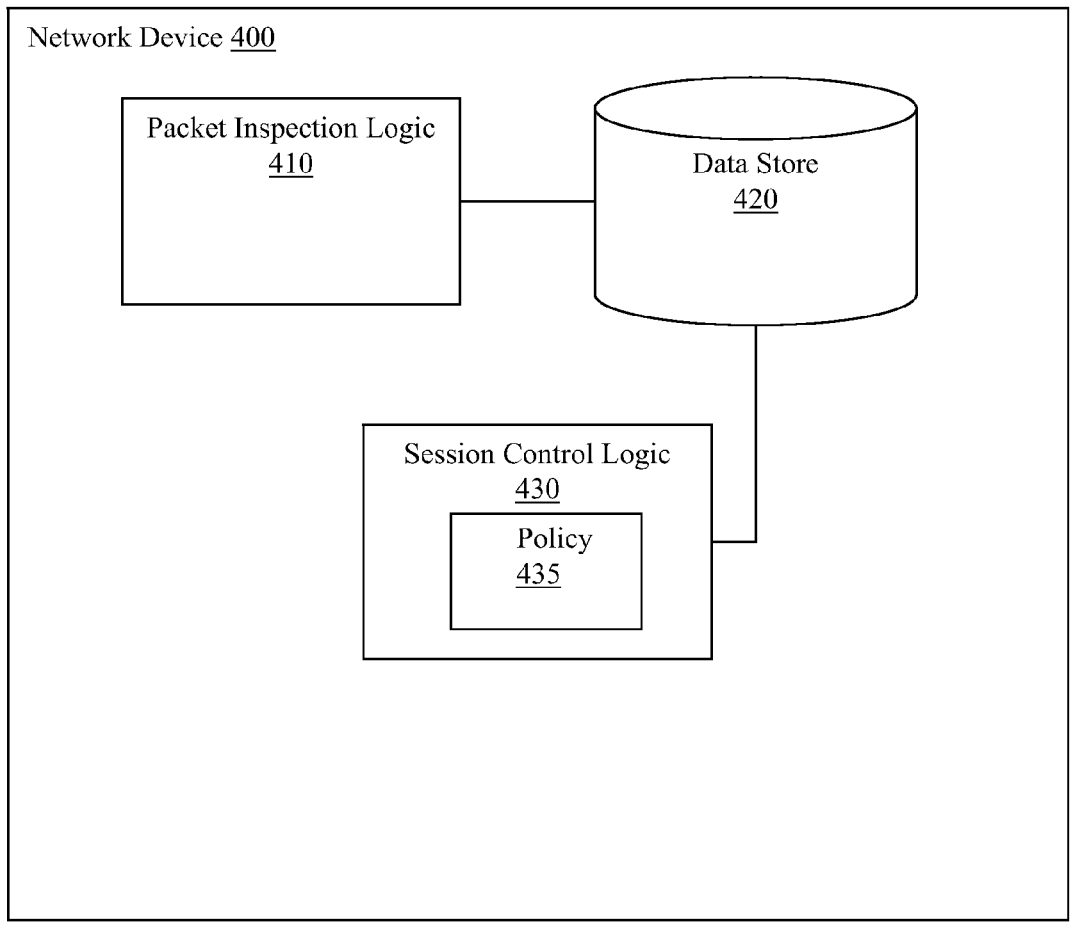
FIG. 4 illustrates an example network device associated with packet inspection.

FIG. 4 illustrates a network device 400 associated with packet inspection. Network device 400 includes a packet inspection logic 410 to inspect a packet from a data stream. As described above a data stream comprises a sequence of packets transmitted from a source device to a destination device. Packet inspection logic 410 may inspect the packet for session data identifying a session associated with the data stream. Packet inspection logic 410 may also inspect the packet for application data identifying an application associated with the data stream. The application may be, for example, a hyper text transfer protocol (HTTP) application, a file transfer protocol (FTP) application, a file sharing application, a voice over internet protocol application, a streaming media application, an online gaming application or other application. Network device 400 also includes a data store 420. Data store 420 may store the session data, the application data and device data identifying a tracked device. The tracked device may be the source device or the destination device.

"Data store," as used herein, refers to a physical and/or logical entity that can store data. A data store may be, for example, a database, a table, a file, a data structure (e.g. a list, a queue, a heap, a tree), a memory, and a register. In different examples, a data store may reside in one logical and/or physical entity and/or may be distributed between two or more logical and/or physical entities.

"Logic" includes but is not limited to hardware, firmware, software in execution on a machine, and/or combinations of each to perform a function(s) or an action(s), and/or to cause a function or action from another logic, method and/or system. Logic may include a software controlled microprocessor, a discrete logic (e.g., ASIC), an analog circuit, a digital circuit, a programmed logic device, and a memory device containing instructions may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Network device 400 also includes a session control logic 430. Session control logic 430 may provide a control signal to cause performance of a predefined action (as defined in a policy 435 accessible by the session control logic 430) upon determining that the data stream causes the tracked device to exceed a threshold value for sessions associated with the application. In one example, data streams associated with a shared session may be treated as being associated with a single session. As described above, the threshold value may be a number of concurrent sessions, a data rate limit, a data size limit, a number of sessions per unit time, and other values.

Figure 5:
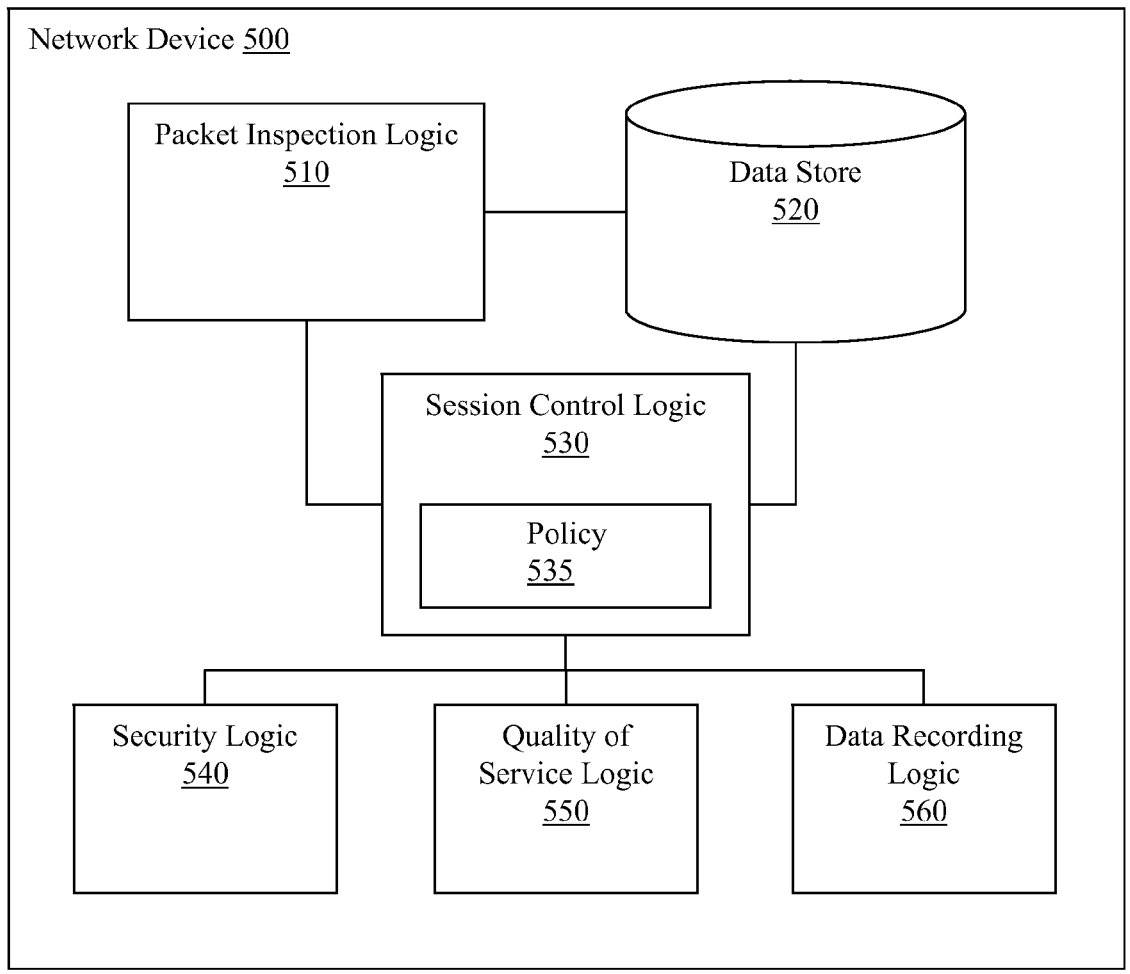
FIG. 5 illustrates an example network device associated with packet inspection.

FIG. 5 illustrates a network device 500 associated with packet inspection. Network device 500 includes several items similar to those described in connection with system 400 (FIG. 4). For example, system 500 includes a packet inspection logic 510, a data store 520, and a session control logic 530. In this network device 500, packet inspection logic 510 may provide a signal to session control logic 530 signifying that a data stream is ready to be analyzed. In one example, logic 510 may be a deep packet inspection logic 510. One skilled in the art will appreciate that other non-DPI logics may be employed. Network device 500 also includes several example action logics 540-560 that may perform an action in response to the control signal provided by session control logic 530 (as defined in a policy 535 accessible by the session control logic 530). For example, a security logic 540 may selectively adjust a security parameter based on the control signal. The security parameter may be associated with the tracked device and/or a data stream associated with the tracked device. In another example, a quality of service logic 550 may selectively adjust a quality of service value based on the control signal. As above, the quality of service value may be associated with the tracked device and/or a data stream associated with the tracked device. In another example, a data recording logic 560 may selectively record data associated with the data stream based on the control signal. While three action logics are described, a person having ordinary skill in the art will appreciate that there may be other types of action logics that could benefit from knowing whether a tracked device has achieved a predetermined connection threshold.

By way of illustration, a large number of HTTP sessions being initiated from a single device may indicate that there is a security concern at the device. For example, distributed denial of service attacks are sometimes caused by a large number of devices attempting to establish multiple sessions with an attacked device. A network device as illustrated in FIGS. 4 and 5 may be able to detect these types of attacks before the attacked device begins to suffer under the load of the connections. In another example, a device opening multiple simultaneous connections may indicate that the device is attempting to sneak a malicious or otherwise inappropriate command through a security measure. By preventing an excess number of simultaneous sessions from opening, the risk of an unmonitored signal passing through a network may be reduced.

The following is an example of the session control logic 430 (and/or session control logic 530). In this example, the session control logic 430 uses a session information table (Table I) and a session control table (Table II) to identify unique flows that belong to a given identity (which, in this particular example, is an end user named John Doe).

TABLE I

Session Information Table

| Source IP | Dest. IP | Source Port | Dest. Port | App. Type | SID |
|---|---|---|---|---|---|
| IP-A | IP-B | SP1 | DP1 | FTP | 1234 |
| IP-A | IP-B | SP1 | DP2 | FTP | 1234 |
| IP-A | IP-B | SP3 | DP3 | HTTP | 1235 |
| IP-A | IP-C | SP4 | DP4 | SSH | 4253 |

TABLE II

Session Control Table

| Interface | User Name | SID | App. Type | Max Sessions |
|---|---|---|---|---|
| 3/1 | JohnDoe | 1234 | FTP | 10 |
| 3/1 | JohnDoe | 5678 | HTTP | 20 |
| 3/1 | JohnDoe | 4253 | SSH | 1 |
| 3/1 | JohnDoe | 8907 | RTP | 3 |

As shown, Table I lists a set of active network connections associated with an IP address "IP-A." Additionally, each connection is associated with a session ID (SID). Table II shows a session control table corresponding to the active connections shown in table 1. In this example, Table II shows that the SID is associated with a given user "JohnDoe"—along with a maximum number of sessions (last column of Table II) allowed for each type of network connection that is active. Further, the maximum number of SSH sessions is one (as determined from the session control table) and the user "JohnDoe" has an open SSH session (as determined from the session information table). Thus, should "JohnDoe" attempt to initiate another SSH session, the network device 400 would enforce the policy by dropping the packets used to initiate a second SSH session. As noted above, such an action may be identified using a variety of techniques, e.g., by inspecting IP packets traversing the network device 400.

In one embodiment, the maximum number of sessions may be determined using a policy stored on the network device 400 (e.g., a network switch). That is, an administrator may define a policy by configuring the network device 400. Alternatively, a policy may be downloaded from an authentication server when a user logs on to a particular network domain. Table III shows an example of a policy template may be applied to "any username," (e.g., "JohnDoe" listed in Tables I and II).

TABLE III

| Policy Template | |
|---|---|
| Match: any username | |
| FTP Max Sessions | 11 |
| HTTP Max Sessions | 21 |
| SSH Max Sessions | 1 |
| RTP Max Sessions | 3 |
| Action: Drop | |

Of course, a policy template could be specific to a particular user (or group of users). In such a case, the policy associated with a given user (or group) could override the policy specified for "any username" above. Similarly, a policy may be associated with a network connection type or identifier. For example, a policy template could specify the maximum number of sessions allowed for an application type for any IP address from a given range of such addresses (e.g., a range handed out to interfaces by a DHCP server).

Figure 6:
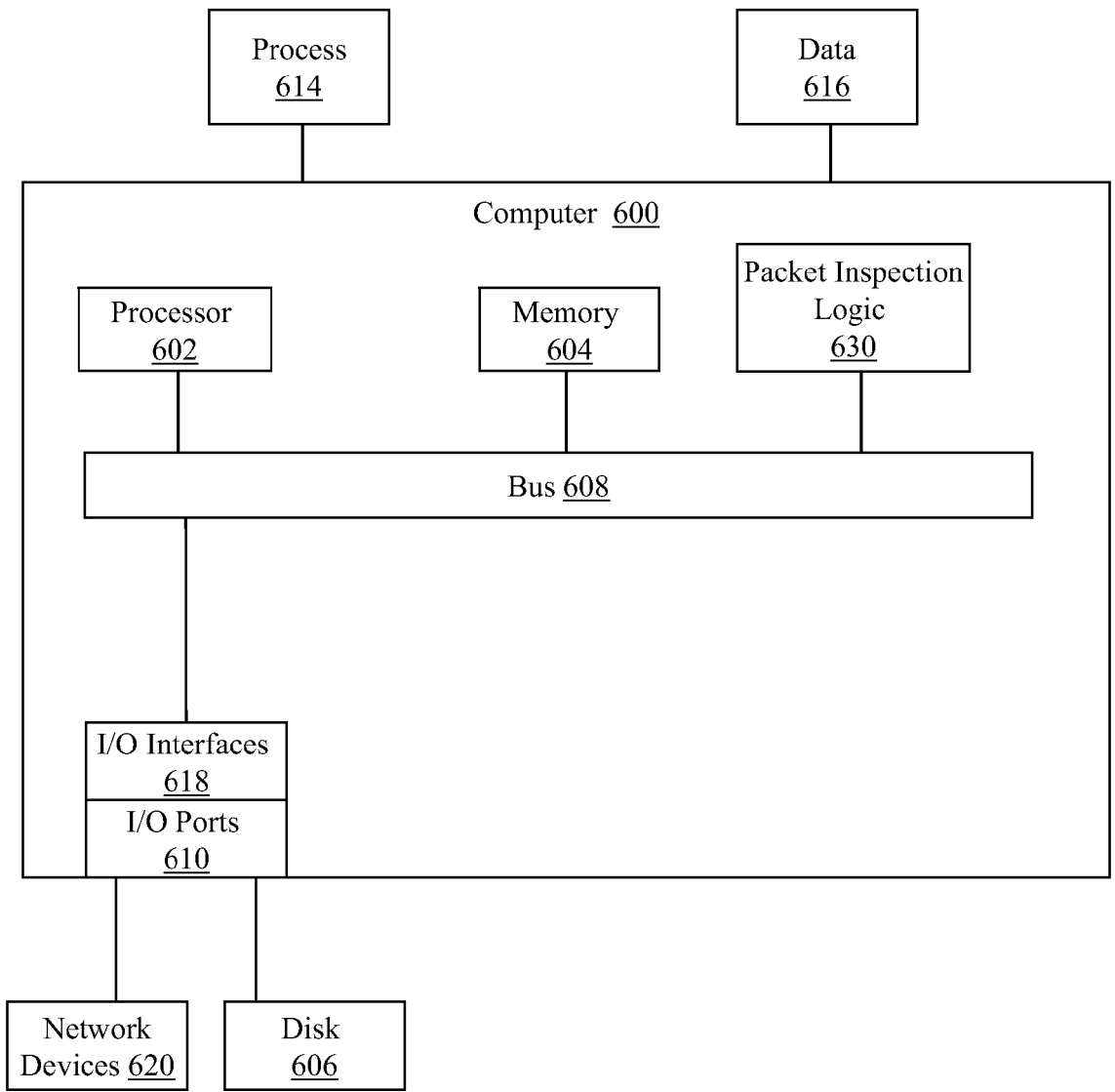
FIG. 6 illustrates an example computing environment in which example systems and methods, and equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a packet inspection logic 630. In different examples, the logic 630 may be implemented in hardware, software, firmware and/or combinations thereof. While the logic 630 is illustrated as a hardware component attached to the bus 608, it is to be appreciated that in one example, the logic 630 could be implemented in the processor 602.

Logic 630 may provide means (e.g., hardware, software, firmware) for inspecting a packet from a data stream for session data. The session data may identify a session associated with the data stream. The data stream may comprise a sequence of packets transmitted from a source device to a destination device. Logic 630 may also provide means (e.g., hardware, software, firmware) for inspecting the packet for application data identifying an application associated with the data stream. Logic 630 may also provide means (e.g., hardware, software, firmware) for controlling a network device to perform an action. The network device may be controlled to perform an action upon determining that the data stream causes the source device or the destination device to exceed a threshold value for sessions associated with an application. The action may comprise dropping a packet, logging data, manipulating a value, and other actions. The means associated with logic 630 may be implemented, for example, as an ASIC. The means may also be implemented as computer executable instructions that are presented to computer 600 as data 616 that are temporarily stored in memory 604 and then executed by processor 602.

Generally describing an example configuration of the computer 600, the processor 602 may be a variety of various processors including dual microprocessor and other multiprocessor architectures. A memory 604 may include volatile memory and/or non-volatile memory. Non-volatile memory may include, for example, read only memory (ROM), programmable ROM (PROM), and other memories. Volatile memory may include, for example, random access memory (RAM), static RAM (SRAM), dynamic RAM (DRAM), and other memories.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card or a memory stick. Furthermore, the disk 606 may be a CD-ROM drive, a CD-Recordable (CD-R) drive, a CD-Re-Writable (CD-RW) drive, a digital video disc (DVD) ROM drive, a Blu-Ray drive or a high definition (HD) DVD drive. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., peripheral component interconnect express (PCIE), 1394, universal serial bus (USB), Ethernet). The bus 608 can be types including, for example, a memory bus, a memory controller, a peripheral bus, an external bus, a crossbar switch and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, and network devices 620. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a local area network (LAN), a wide area network (WAN), and other networks.

While example systems, methods and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the disclosure is not limited to the specific details, the representative apparatus and illustrative examples shown and described. Thus, this application is intended to embrace alterations, modifications and variations that fall within the scope of the appended claims.

While the foregoing is directed to embodiments of the present disclosure, other and further embodiments of the disclosure may be devised without departing from the basic scope thereof, and the scope thereof is determined by the claims that follow.

The invention claimed is:

1. A computer-readable storage medium storing computer-executable instructions that when executed by a computer cause the computer to perform an operation to restrict endpoint-specific application sessions, the operation comprising:
   retrieving a network policy defining a threshold value related to a characteristic of network performance and an associated action, where the network policy is based on at least one of an application type and an endpoint destination;
   receiving, in a network device, a packet transmitted as part of a data stream, where the data stream comprises a sequence of packets;
   identifying a session associated with the data stream, an application associated with the session, and an endpoint destination of the data stream;
   storing a set of data associated with the data stream, where the set of data is based on the identified session, the identified application, and the identified endpoint destination;
   determining, whether the stored data exceeds the threshold value; and
   upon determining that the stored data exceeds the threshold value, restricting the application session of the endpoint destination by controlling the network device to perform the action.

2. The computer-readable storage medium of claim 1, where identifying a session associated with the data stream comprises inspecting the packet using one or more of, stateful classification, stateless classification, and statistical classification.

3. The computer-readable storage medium of claim 1, where identifying an application with which the data stream is associated comprises inspecting the packet using one or more of, stateful classification, stateless classification, and statistical classification.

4. The computer-readable storage medium of claim 3, where inspecting the packet comprises determining the application with which the data stream is associated using deep packet inspection for one or more of, stateful classification, stateless classification and statistical classification.

5. The computer-readable storage medium of claim 1, where the endpoint destination is one of, a user, a device and a virtual device.

6. The computer-readable storage medium of claim 1, where the session comprises a set of related data channels and associated control channels.

7. The computer-readable storage medium of claim 1, where the action comprises one or more of dropping the packet, dropping all packets related to the session, throttling the session, adjusting an attribute of a single session associated with the identity, adjusting an attribute associated with a collection of sessions associated with the identity, adjusting an attribute associated with the session, adjusting an attribute associated with the application, and adjusting the attribute associated with the collection of sessions.

8. The computer-readable storage medium of claim 1, where the action comprises logging data associated with the data stream and with the session.

9. The computer-readable storage medium of claim 8, where the data is one or more of, billing data, and resource data.

10. The computer-readable storage medium of claim 1, where the action is performed for one or more of, a collection of channels associated with the session, and an individual channel associated with the session.

11. The computer-readable storage medium of claim 1, where the characteristics of network performance comprise one or more of a maximum number of concurrent sessions, a data rate limit, a data size limit, a maximum number of sessions per unit time, and a maximum number of channels per session.

12. The computer-readable storage medium of claim 1, where the application is one or more of, a hyper text transfer protocol (HTTP) application, a file transfer protocol (FTP) application, a file sharing application, a voice over internet protocol application, a streaming media application, and an online gaming application.

13. A network device, comprising:
a retrieval logic to retrieve a network policy defining a threshold value related to a characteristic of network performance and an associated action, where the network policy is based on at least one of an application type and an endpoint destination;
a packet receiving logic to receive a packet from a data stream where the data stream comprises a sequence of packets;
a packet inspection logic to identify a session associated with the data stream, an application associated with the session, and an endpoint destination of the data stream;
a data store to store a set of data associated with the data stream, where the set of data is based on the identified session, the identified application, and the identified endpoint destination;
a comparison logic to determine whether the stored data exceeds the threshold value: and
upon determining that the stored data exceeds the threshold value, a session control logic to restrict the application session of the endpoint destination by providing a control signal causing the network device to perform the action.

14. The network device of claim 13, comprising a security logic to selectively adjust a security parameter as a function of the control signal.

15. The network device of claim 13, comprising a quality of service logic to selectively adjust a quality of service value as a function of the control signal.

16. The network device of claim 13, comprising a data recording logic to selectively record data associated with at least the session in response to receiving the control signal.

17. The network device of claim 13, where the action comprises redirecting network traffic associated with the session.

18. The network device of claim 13, where the threshold specifies one or more of a maximum number of concurrent sessions, a data rate limit, a data size limit, a maximum number of sessions per unit time, and a maximum number of channels per session.

19. The network device of claim 13, where the application is one or more of, a hyper text transfer protocol (HTTP) application, a file transfer protocol (FTP) application, a file sharing application, a voice over internet protocol application, a streaming media application, and an online gaming application.

20. A computer-implemented method, comprising:
retrieving a network policy defining a threshold value related to a characteristic of network performance and an associated action, where the network policy is based on at least one of an application type and an endpoint destination;
receiving, in a network device, a packet transmitted as part of a data stream, where the data stream comprises a sequence of packets;
identifying a session associated with the data stream, an application associated with the session, and an endpoint destination of the data stream;
storing a set of data associated with the data stream, where the set of data is based on the identified session, the identified application, and the identified endpoint destination;
determining whether the stored data exceeds the threshold value; and
upon determining that the stored data exceeds the threshold value, restricting the application session of the endpoint destination by controlling the network device to perform the action.

* * * * *